United States Patent
Koike

(10) Patent No.: US 11,171,582 B2
(45) Date of Patent: Nov. 9, 2021

(54) DRIVE DEVICE FOR CORRECTING ANGULAR DEVIATION BETWEEN SHAFTS

(71) Applicant: Takahisa Koike, Tokyo (JP)

(72) Inventor: Takahisa Koike, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 41 days.

(21) Appl. No.: 16/427,454

(22) Filed: May 31, 2019

(65) Prior Publication Data

US 2019/0386590 A1 Dec. 19, 2019

(30) Foreign Application Priority Data

Jun. 13, 2018 (JP) .............................. JP2018-113111

(51) Int. Cl.
*H02P 5/56* (2016.01)
*H02P 5/753* (2006.01)

(52) U.S. Cl.
CPC .............. *H02P 5/56* (2016.02); *H02P 5/753* (2013.01)

(58) Field of Classification Search
CPC .................................. H02P 5/56; H02P 5/753
See application file for complete search history.

(56) References Cited

U.S. PATENT DOCUMENTS

| 5,430,361 | A | * | 7/1995 | Wells | F16H 57/12 318/630 |
|---|---|---|---|---|---|
| 2013/0261864 | A1 | * | 10/2013 | Noguchi | B60L 15/2072 701/22 |
| 2015/0022137 | A1 | * | 1/2015 | Maeda | G05B 13/021 318/632 |
| 2015/0120113 | A1 | * | 4/2015 | Oyobe | B60W 10/08 701/22 |
| 2016/0149443 | A1 | | 5/2016 | Hashimoto et al. | |
| 2018/0065617 | A1 | * | 3/2018 | Tsuchida | B60W 30/20 |
| 2018/0254721 | A1 | | 9/2018 | Koike | |

FOREIGN PATENT DOCUMENTS

| JP | 2004-117956 | 4/2004 |
|---|---|---|
| JP | 2018-148647 | 9/2018 |
| WO | WO2007/099635 A | 9/2007 |

* cited by examiner

*Primary Examiner* — Kawing Chan
*Assistant Examiner* — Bradley R Brown
(74) *Attorney, Agent, or Firm* — IPUSA, PLLC

(57) ABSTRACT

A drive device includes a first motor, a second motor, and circuitry. The first motor includes a first rotation detector and is configured to rotate a driven shaft to apply a driving torque to the driven shaft. The second motor includes a second rotation detector and is configured to rotate the driven shaft to reduce backlash between the first motor and the driven shaft. The circuitry is configured to control the first motor and the second motor, based on a detection signal of the second rotation detector.

10 Claims, 12 Drawing Sheets

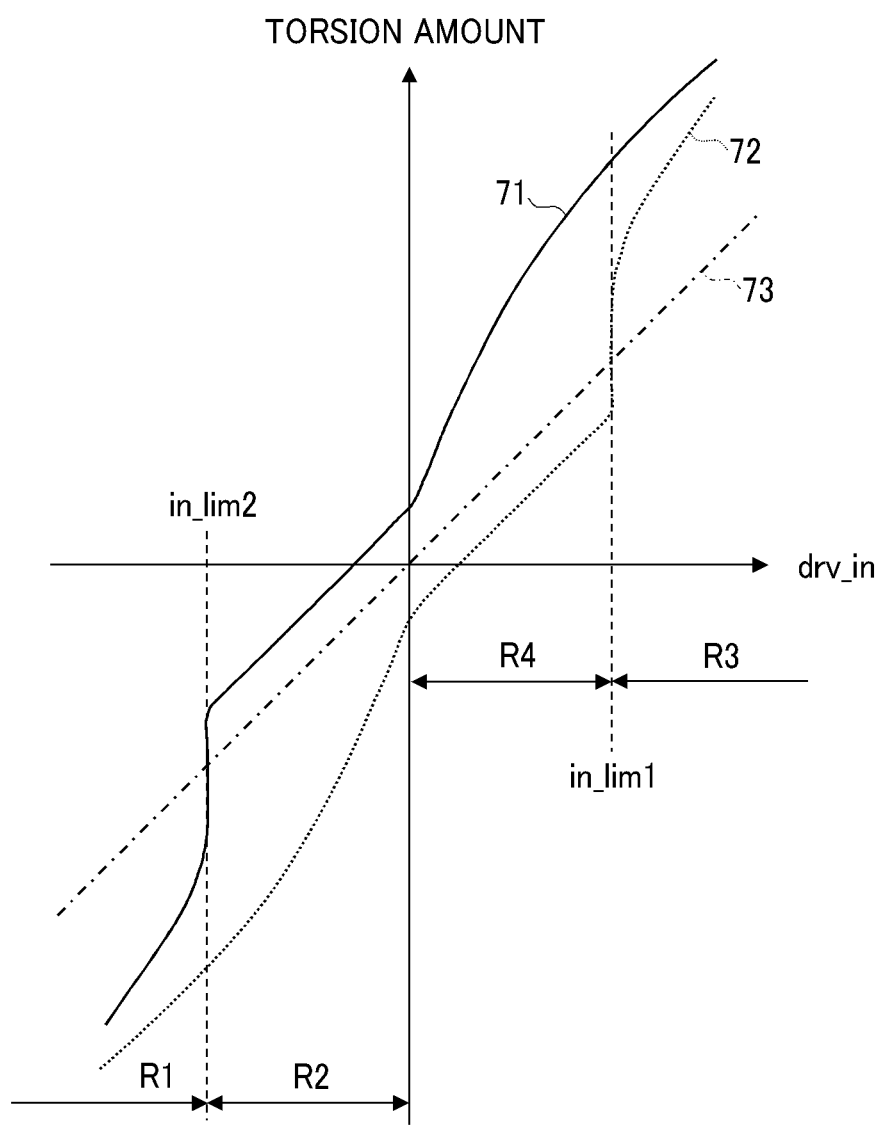

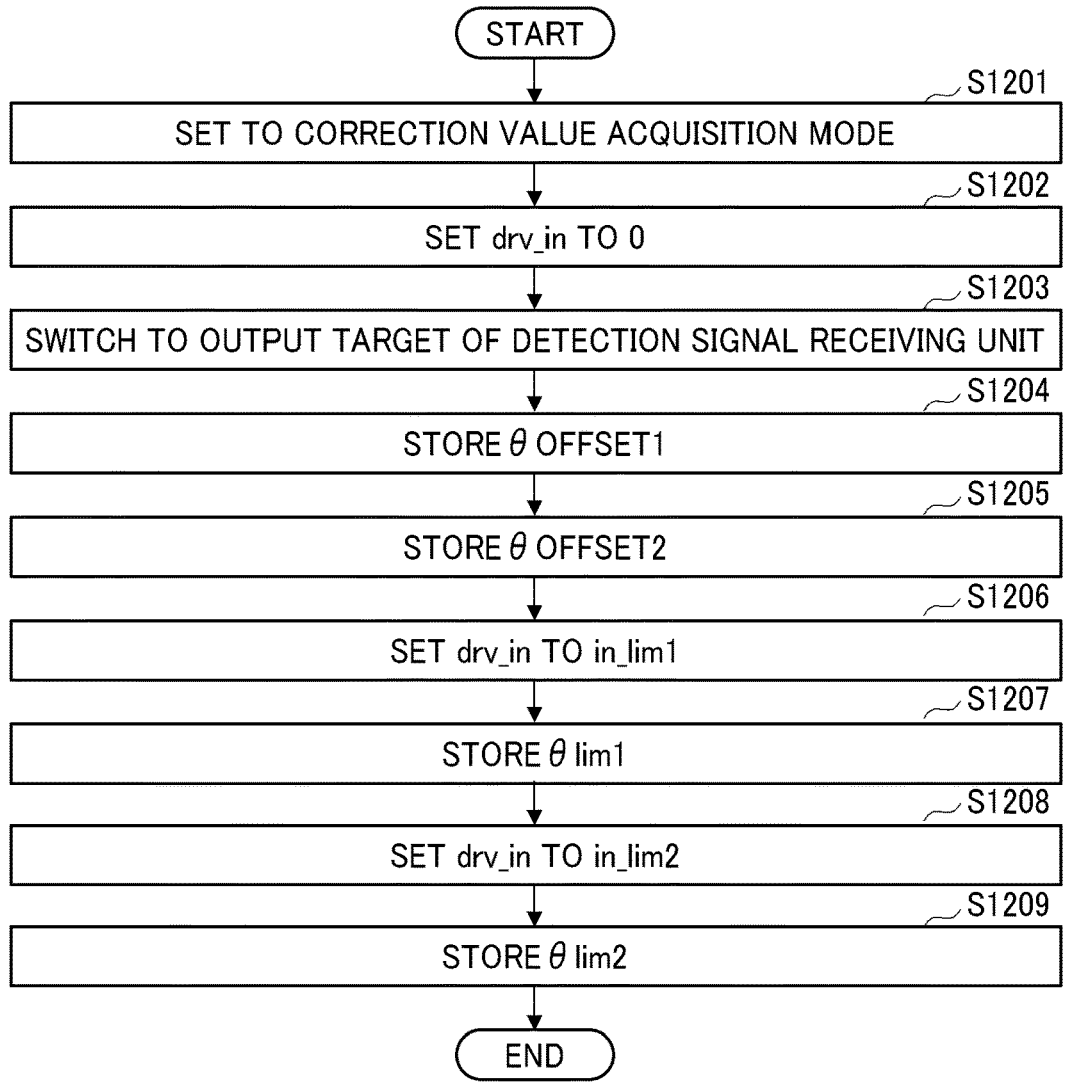

DRIVE DEVICE FOR CORRECTING ANGULAR DEVIATION BETWEEN SHAFTS

CROSS-REFERENCE TO RELATED APPLICATION

This patent application is based on and claims priority pursuant to 35 U.S.C. § 119(a) to Japanese Patent Application No. 2018-113111, filed on Jun. 13, 2018, in the Japan Patent Office, the entire disclosure of which is hereby incorporated by reference herein.

BACKGROUND

Technical Field

This disclosure relates to a drive device for correcting an angular deviation between shafts.

Related Art

A technology of multi-motor control is known to control rotation of a common output shaft that is driven by multiple motors to enhance an increase in torque and a reduction in backlash. In particular, a double-motor control technology is used to control two motors. Further, there is another technology in which the angle of an output shaft is controlled with feedback control of the detection signal obtained by a motor shaft encoder or an output shaft encoder, so that the position and speed of the output shaft are controlled.

In the double-motor control technology, application of preload torque to one of the two motors reduces backlash, and therefore the angle of the output shaft is controlled accurately. However, due to the rigidity of a reduction gear from the multiple motors to the output shaft, an angular deviation corresponding to the load torque occurs between the rotary shaft of each motor and the output shaft, and therefore the position control by the output shaft cannot be performed accurately.

To solve such problems, a known technique is disclosed that stores a correction value in a memory for each angle of the output shaft, and corrects an angular deviation between the rotary shaft of each motor and the output shaft.

SUMMARY

At least one aspect of this disclosure provides a drive device including a first motor, a second motor, and circuitry. The first motor includes a first rotation detector and is configured to rotate a driven shaft to apply a driving torque to the driven shaft. The second motor includes a second rotation detector and is configured to rotate the driven shaft to reduce backlash between the first motor and the driven shaft. The circuitry is configured to control the first motor and the second motor, based on a detection signal of the second rotation detector.

Further, at least one aspect of this disclosure provides a drive device including a first motor, a second motor, and circuitry. The first motor includes a first rotation detector and is configured to rotate a driven shaft to apply a driving torque to the driven shaft. The second motor includes a second rotation detector and is configured to apply a driving torque to the driven shaft. The circuitry is configured to control the first motor and the second motor, based on a detection signal of the second rotation detector.

Further, at least one aspect of this disclosure provides a drive device including a first motor, a second motor, and circuitry. The first motor includes a first rotation detector and is configured to rotate a driven shaft based on a drive command that is a command value indicating one of a voltage value, a current value, and a torque value. The second motor includes a second rotation detector and is configured to rotate the driven shaft based on the drive command. The circuitry is configured to select one of a detection signal of the first rotation detector and a detection signal of the second rotation detector, based on the drive command, and control the first motor and the second motor, based on the one of the detection signal of the first rotation detector and the detection signal of the second rotation detector, selected by the circuitry. The circuitry is configured to select the detection signal of the second rotation detector in one of a case in which the command value is less than a negative limit value and a case in which the command value is equal to or greater than 0 and is less than a positive limit value, and select the detection signal of the first rotation detector in one of a case in which the command value is equal to or greater than the negative limit value and is less than 0 and a case in which the command value is equal to or greater than the positive limit value.

BRIEF DESCRIPTION OF THE SEVERAL VIEWS OF THE DRAWINGS

An exemplary embodiment of this disclosure will be described in detail based on the following figured, wherein:

FIG. 7 is a diagram illustrating an example of the relationship between torsion of a motor and a voltage command value;

FIG. 12 is a flowchart of acquiring processes of a correction value of the drive device according to Embodiment 1;

FIG. 13 is a diagram illustrating an example of a table indicating the relation of command values and correction values according to Embodiment 1;

DETAILED DESCRIPTION

Figure 1:
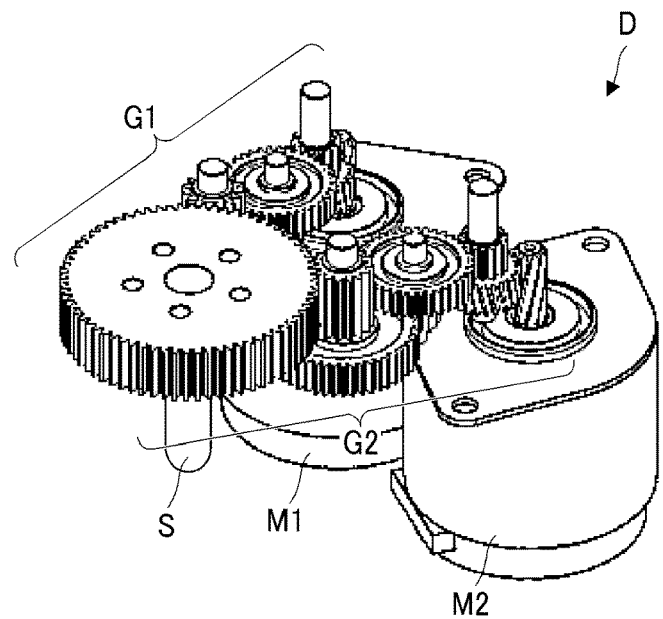
FIG. 1 is a perspective view illustrating an example of a drive system driven by double-motor control.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of a drive device according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Descriptions are given of a drive device according to an embodiment of this disclosure with reference to drawings.

It is to be noted that elements (for example, mechanical parts and components) having the same functions and shapes are denoted by the same reference numerals throughout the specification and redundant descriptions are omitted.

Embodiment 1

A description is given of a drive device according to Embodiment 1.

Figure 2:
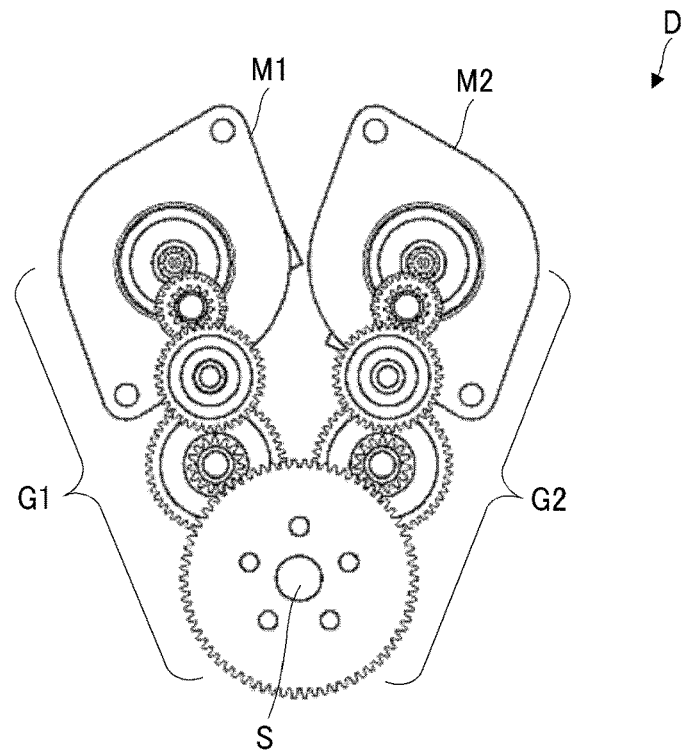
FIG. 2 is a plan view illustrating the drive system driven by double-motor control.

FIG. 1 is a perspective view illustrating an example of a drive unit D that is driven using double motor control. FIG. 2 is a plan view illustrating the drive unit D.

As illustrated in FIGS. 1 and 2, the drive unit D includes a motor M1, a motor M2, an output shaft S, a transmission unit G1, and a transmission unit G2. It is to be noted that the drive unit D further includes a motor shaft encoder E1 that measures an angle θ1 of the motor M1 and a motor shaft encoder E2 that measures an angle θ2 of the motor M2. The motor shaft encoder E1 may be externally attached to the motor M1 or may be incorporated in the motor M1. Similarly, the motor shaft encoder E2 may be externally attached to the motor M2 or may be incorporated in the motor M2.

The motor M1 functions as a first motor and the motor M2 functions as a second motor. The motor shaft encoder E1 functions as a first rotation detector and the motor shaft encoder E2 functions as a second rotation detector. The output shaft S functions as a driven shaft.

It is to be noted that, in order to simplify the description below, the "motor shaft encoder" is occasionally referred to as the "encoder." In addition, the angle of the motor is synonymous with the rotation angle of the motor. Similarly, the angle of the output shaft is synonymous with the rotation angle of the output shaft.

The motor M1 is one of the two motors controlled by the double motor control. The motor M1 applies a torque T1 to the output shaft S via the transmission unit G1 to drive the output shaft S. The motor M2 is the other one of the two motors controlled by the double motor control. The motor M2 applies a torque T2 to the output shaft S via the transmission unit G2 to drive the output shaft S. The motors M1 and M2 are, for example, brushless DC (Direct Current) motors. However, a DC motor with a brush or an AC (Alternating Current) motor may be used.

The output shaft S is an output shaft driven by the double motor control. The transmission unit G1 includes a set of gears that transmit rotation of the motor M1 to the output shaft S. The transmission unit G2 includes a set of gears that transmit rotation of the motor M2 to the output shaft S. The set of gears includes a reduction gear, for example. In the double motor control, the motors M1 and M2 are controlled to drive the output shaft S.

Figure 3B:
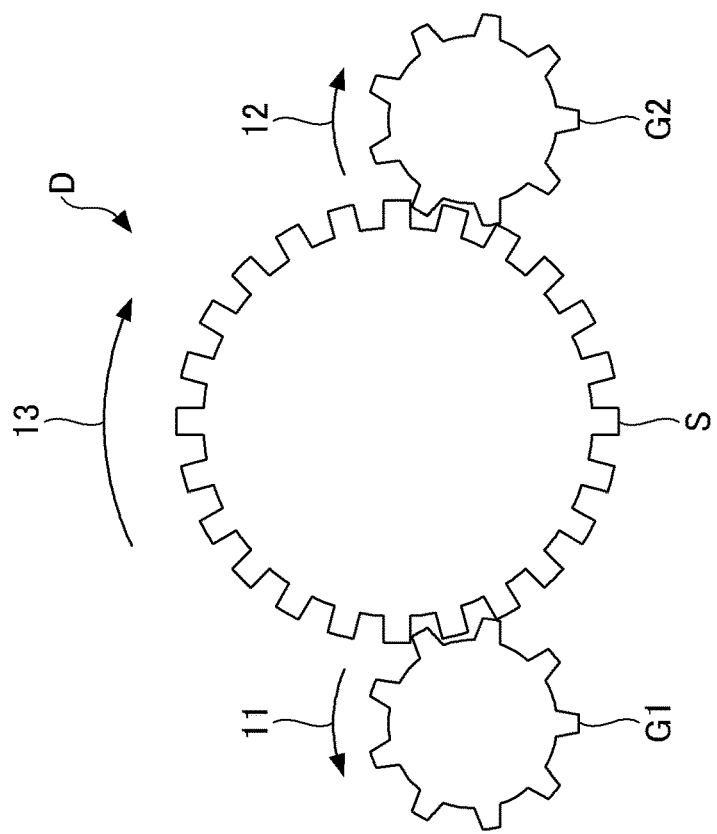
FIG. 3B is a schematic diagram illustrating an example of driving of an output shaft by double-motor control to increase the torque.
Figure 3A:
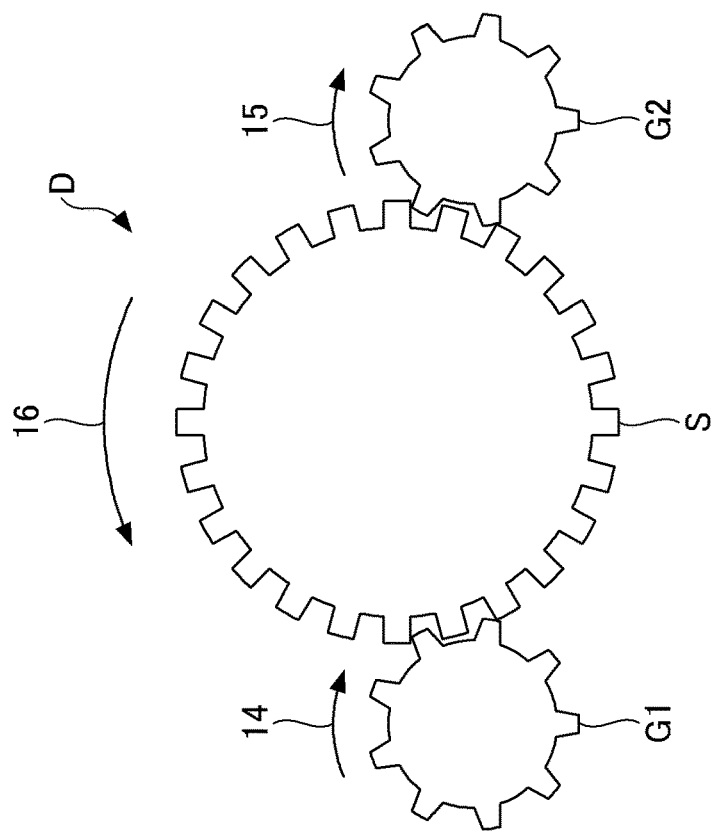
FIG. 3A is a schematic diagram illustrating an example of driving of an output shaft by double-motor control to reduce backlash.

FIG. 3A is a schematic diagram illustrating an example of driving of an output shaft by double-motor control to reduce backlash, and FIG. 3B is a schematic diagram illustrating an example of driving of an output shaft by double-motor control to increase the torque. FIGS. 3A and 3B illustrate respective states in which, in the drive unit D, the transmission unit G1 that is driven by the motor M1 and the transmission unit G2 that is driven by the motor M2 drive the output shaft S.

As described above, FIG. 3A is a schematic diagram illustrating an example of driving of the output shaft S by double-motor control to reduce backlash. The transmission unit G1 rotates in a direction indicated by arrow 11 to apply a drive torque to the output shaft S. The output shaft S rotates in a direction indicated by arrow 13 in accordance with the drive torque. By contrast, the transmission unit G2 rotates in a direction indicated by arrow 12, which is a direction opposite to the direction of rotation of the transmission unit G1. By applying a torque in the reverse direction to the transmission unit G1 by the transmission unit G2, backlash between the output shaft S and the transmission unit G1 is prevented, and therefore backlash is reduced. The reverse torque applied by the transmission unit G2 is referred to as preload torque.

As described above, FIG. 3B is a schematic diagram illustrating an example of driving of the output shaft S by double-motor control to increase torque. The transmission unit G1 rotates in a direction indicated by arrow 14 to apply a drive torque to the output shaft S. The output shaft S rotates in a direction indicated by arrow 16 according to the drive torque. The transmission unit G2 rotates in the same direction as the direction of rotation of the transmission unit G1. By applying torque in the same direction as the transmission unit G1 by the transmission unit G2, the torque of the transmission unit G2 is added to the torque of the transmission unit G1, and therefore the torque of the output shaft S is increased.

Figure 4:
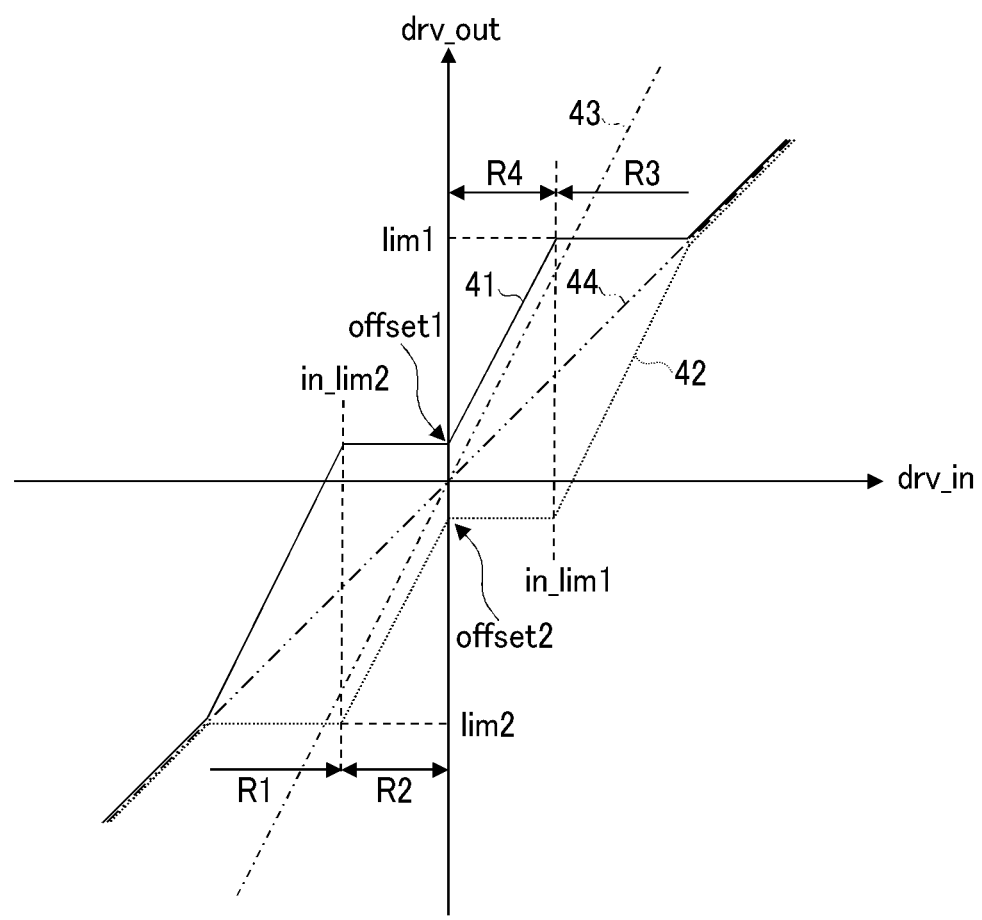
FIG. 4 is a diagram illustrating an example of a voltage applied to a motor.

FIG. 4 is a graph illustrating an example of a voltage applied to the motor M1 and the motor M2.

The vertical axis in the graph of FIG. 4 indicates an applied voltage drv_out of the motors M1 and M2, and the horizontal axis in the graph of FIG. 4 indicates a voltage command value drv_in. A solid line 41 indicates an applied voltage of the motor M1, and a dotted line 42 indicates an applied voltage of the motor M2. A one-dot chain line 43 indicates a total of the applied voltages of the motors M1 and M2, and a two-dot chain line 44 is an average of the applied voltages of the motors M1 and M2. It is to be noted that "drv_in" and "drv_out" are described as voltage values in the present embodiment. However, "drv_in" and "drv_out" may be described as current values or torque values. This note is also applicable to "drv_in" and "drv_out" described below with reference to drawings.

In the example of FIG. 4, it is assumed that, due to application of positive voltage, the motor M1 applies a torque T1 to the output shaft S in a first direction and the motor M2 applies a torque T2 to the output shaft S in the first direction. In addition, it is assumed that, due to application of negative voltage, the motor M1 applies torque T1 to the output shaft S in a second direction that is opposite to the first direction and the motor M2 applies torque T2 to the output shaft S in the second direction.

In FIG. 4, "lim1" indicates the positive limit voltage of the applied voltage, and "lim2" indicates the negative limit voltage of the applied voltage. Further, "in_lim1" indicates a voltage command value when the applied voltage becomes a positive limit voltage, and "in_lim2" indicates a voltage command value when the applied voltage becomes a negative remote voltage. Furthermore, "offset1" indicates a positive offset voltage, and "offset2" indicates a negative offset voltage. An offset voltage is a voltage applied to a motor when a voltage command value is set to zero. It is to be noted that "in_lim1" is an example of the "positive limit value", and "in_lim2" is an example of the "negative limit value."

A region R1 indicates a range in which the voltage command value drv_in is less than in_lim2. A region R2 indicates a range in which the voltage command value drv_in is equal to or greater than in_lim2 and less than zero (0). A region R3 indicates a range in which the voltage command value drv_in is equal to or greater than in_lim1. A region R4 indicates a range in which the voltage command value drv_in is equal to or greater than zero (0) and less than in_lim1.

In the region R1, a voltage from the limit voltage lim2 to the offset voltage offset1 is applied to the motor M1, and a predetermined limit voltage lim2 is applied to the motor M2. As the absolute value of the negative voltage applied to the motor M1 increases, the torque T1 in the second direction applied to the output shaft S by the motor M1 increases. In the region R1, the motor M1 functions as a drive motor to drive the output shaft S in the second direction. However, since the torque T2 is applied by the motor M2 in the second direction that is same as the torque T1, a torque Tout that is applied to the output shaft S is increased.

In the region R2, a predetermined offset voltage offset1 is applied to the motor M1, and a voltage from the limit voltage lim2 to the offset voltage offset2 is applied to the motor M2. As the absolute value of the negative voltage applied to the motor M2 increases, the torque T2 in the second direction applied to the output shaft S by the motor M2 increases. In the region R2, the motor M2 functions as a drive motor that drives the output shaft S in the second direction.

In the region R2, the motor M1 applies a predetermined torque T1 to the output shaft S in the first direction, and the motor M2 applies a torque T2 to the output shaft S in the second direction. Therefore, the torque Tout applied to the output shaft S is the difference between the torque T1 and the torque T2. The motor M1 applies a torque in the opposite direction to the motor M2 to the output shaft S. By so doing, the gear of the output shaft S and the gear of the transmission system G2 of the motor M2 are pressed, and backlash between the output shaft S and the motor M2 is reduced.

In the region R3, a predetermined limit voltage lim1 is applied to the motor M1, and a voltage from the offset voltage offset2 to the limit voltage lim1 is applied to the motor M2. As the absolute value of the positive voltage applied to the motor M2 increases, the torque T2 in the first direction applied to the output shaft S by the motor M2 increases. In the region R3, the motor M2 functions as a drive motor that drives the output shaft S in the first direction. However, since the motor M1 applies the torque T1 in the same first direction as the torque T2, the torque Tout that is applied to the output shaft S increases.

In the region R4, a voltage from the offset voltage offset1 to the limit voltage lim1 is applied to the motor M1, and a predetermined offset voltage offset2 is applied to the motor M2. As the absolute value of the positive voltage applied to the motor M1 increases, the torque T1 in the first direction applied to the output shaft S by the motor M1 increases. In the region R4, the motor M1 functions as a drive motor that drives the output shaft S in the first direction.

In the region R4, the motor M1 applies the torque T1 to the output shaft S in the first direction, and the motor M2 applies the torque T2 to the output shaft S in the second direction. Therefore, the torque Tout applied to the output shaft S is the difference between the torque T1 and the torque T2. By contrast, when the motor M2 applies a torque in the reverse direction to the motor M1 to the output shaft S, the gear of the output shaft S and the gear of the transmission unit G2 of the motor M1 are pressed, and backlash between the output shaft S and the motor M1 is reduced.

As described above, in the double motor control, the voltage that is applied to the motors M1 and M2 is controlled, so as to increase the torque Tout to be applied to the output shaft S or reduce the backlash.

Next, a description is given of a motor and causes of the angular deviation of an output shaft, in the double-motor control.

The causes of the angular deviation of the output shaft include distortion of a rotary shaft such as a motor and an output shaft, deformation of gear teeth, lateral deviation (shift) of the rotary shaft caused by deformation of a frame that supports a rotary shaft such as a motor.

Figure 5:
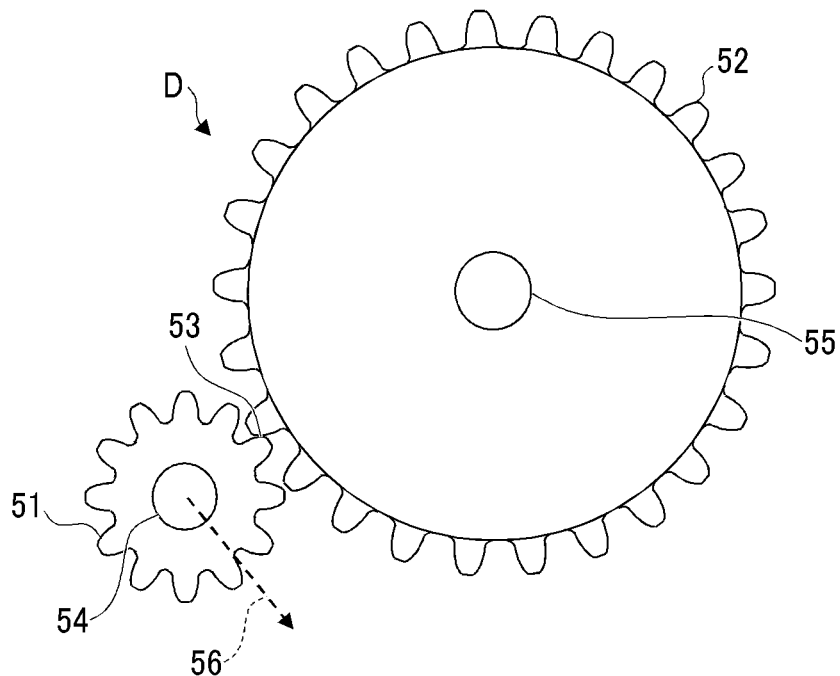
FIG. 5 is a schematic diagram illustrating an example of a generation point of a cause of an angular deviation in the drive system.

FIG. 5 is a schematic diagram illustrating an example of a generation point of a cause of an angular deviation in the drive system D.

FIG. 5 depicts the drive unit D in a state in which a gear 51 that is mounted on the motor M1 and a gear 52 that is mounted on the output shaft S are meshed with each other at a meshing portion 53.

Torsion of a rotary shaft occurs at each of the rotary shaft 54 of the motor M1 and the rotary shaft 55 of the output shaft S. It is to be noted that torsion is deformation such as twisting around a shaft due to an applied torque to the shaft.

For example, in a known technique, the angular deviation to the angle of a gear is corrected but the influence of torsion of the rotary shaft of each motor according to the load torque is not removed. Therefore, the correction accuracy was not sufficient.

The deformation of the gear teeth occurs at the meshing portion 53.

Figure 6A:
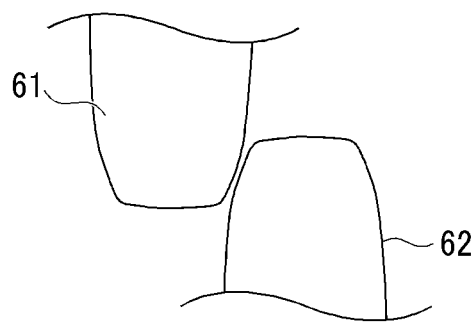
FIG. 6A is a schematic diagram illustrating an example of meshing of gear teeth in a case in which the gear teeth are not deformed.
Figure 6B:
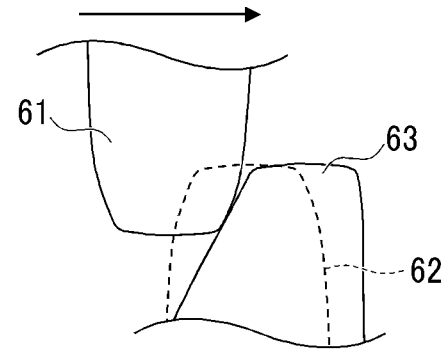
FIG. 6B is a schematic diagram illustrating an example of meshing of gear teeth in a case in which one of the gear teeth is deformed.

Here, FIGS. 6A and 6B are diagrams illustrating an example of deformation of gear teeth. A gear tooth 61 of one gear and a gear tooth 62 of another gear that meshes with the one gear contact with each other at a meshing point. FIG. 6A is a schematic diagram illustrating an example of meshing of gear teeth in a case in which the gear teeth are not deformed. By contrast, FIG. 6B is a schematic diagram illustrating an example of meshing of gear teeth in a case in which one of the gear teeth is deformed. In FIG. 6B, the torque adds force in the direction indicated by a solid line arrow to elastically deform the gear tooth 62 to be as a gear tooth 63. At a gear meshing point, deformation of the gear teeth occurs as illustrated in FIG. 6B, resulting in an angular deviation.

As illustrated in FIG. 5, as the torque exerts the force, the frame that supports the rotary shaft 54 of the motor M1 is deformed. Accordingly, it is likely that, for example, the rotary shaft 54 shifts in the direction indicated by a dotted line arrow 56 in FIG. 5. Such lateral displacement of a rotary shaft due to deformation of the frame also causes an angular deviation.

When a multistage gear including multiple gears is used in a transmission unit of a motor, the cause of the above-described angular deviation is added according to the number of gears.

Next, a description is given of the motor M1 and the torsion of the rotary shaft of the transmission unit G1, the motor M2 and the torsion of the rotary shaft of the transmission unit G2, and the torsion of the rotary shaft of the output shaft S, with reference to FIG. 7.

It is to be noted that, in order to simplify the description, the phrase "torsion of the rotary shaft" is referred to as "torsion." In addition, the motor M1 and the transmission unit G1 are collectively referred to as a "motor M1 system", and the motor M2 and the transmission unit G2 are collectively referred to as a "motor M2 system."

FIG. 7 is a diagram illustrating an example of the relationship between torsion of the motor M1 system, torsion of the motor M2 system, and torsion of the output shaft S and a voltage command value drv_in. The horizontal axis in FIG. 7 indicates the voltage command value drv_in, and the vertical axis in FIG. 7 indicates a torsion amount.

In FIG. 7, a solid line 71 indicates a torsion amount of the motor M1 system to the output shaft S, a broken line 72 indicates a torsion amount of the motor M2 system to the output shaft S, and a single-dot broken line 73 indicates a torsion amount of the output shaft S. A region R1 in FIG. 7 corresponds to the region R1 in FIG. 4, a region R2 in FIG. 7 corresponds to the region R2 in FIG. 4, a region R3 in FIG. 7 corresponds to the region R3 in FIG. 4, and a region R4 in FIG. 7 corresponds to the region R4 in FIG. 4.

The torque to be given to the output shaft S increases in proportion to the voltage command value drv_in, and the torsion amount of the output shaft S increases in proportion to the torque. Therefore, assuming the linearity between the voltage command value drv_in and the torque, as illustrated by the single-dot broken line 73 in FIG. 7, the torsion amount of the output shaft S increases in proportion to the voltage command value drv_in.

In the region R4, a predetermined offset voltage offset2 is applied to the motor M2 system, and a predetermined torque T2 corresponding to the predetermined offset voltage offset2, as illustrated in FIG. 4. Therefore, the torsion amount of the motor M2 system corresponds to the predetermined torque T2. Accordingly, the torsion amount of the motor M2 system with respect to the output shaft S varies according to the torsion amount of the output shaft S and, as indicated by a broken line 72 in FIG. 7, the torsion amount of the motor M2 system with respect to the output shaft S increases in proportion to the voltage command value drv_in.

By contrast, a torque T1 that gradually increases along with the applied voltage is applied to the motor M1 system. Immediately after rotation of the motor M1 is transmitted to the transmission unit G1, the torque T1 is hardly generated due to backlash of the gear. As the motor M1 rotates, the gear teeth of the gears of the transmission unit G1 start meshing with each other, and the motor M1 system enters a low rigidity region. Therefore, the backlash is gradually cancelled, and the torque T1 changes to be nonlinear in response to rotation of the motor M1. According to the torque T1, the torsion amount of the motor M1 system with respect to the output shaft S changes to be nonlinear.

In the region R3, the torque T2 in a direction opposite the direction of the region R4 is applied to the motor M2 system, and increases gradually. Therefore, the torsion amount of the motor M2 system immediately after entrance to the region R3 increases abruptly, and changes to be nonlinear.

By contrast, in the motor M1 system, a predetermined limit voltage lim1 is applied and a predetermined torque T1 corresponding to the predetermined limit voltage lim1 is applied, and therefore the torsion amount of the motor M1 system corresponds to the predetermined torque T1. Accordingly, the torsion amount of the motor M1 system with respect to the output shaft S varies according to the torsion amount of the output shaft S and, as indicated by a solid line 71 in FIG. 7, the torsion amount of the motor M1 system with respect to the output shaft S increases in proportion to the voltage command value drv_in.

In the region R2, the predetermined offset voltage offset1 is applied to the motor M1 system, and the predetermined torque T1 corresponding to the predetermined offset voltage offset1. Therefore, the torsion amount of the motor M1 system corresponds to the predetermined torque T1. Accordingly, the torsion amount of the motor M1 system with respect to the output shaft S varies according to the torsion amount of the output shaft S and, as indicated by a solid line 71 in FIG. 7, the torsion amount of the motor M1 system with respect to the output shaft S increases in proportion to the voltage command value drv_in.

By contrast, the torque T2 that gradually increases along with the applied voltage is applied to the motor M2 system. Immediately after rotation of the motor M2 is transmitted to the transmission unit G2, the torque T2 is hardly generated due to backlash of the gear. As the motor M2 rotates, the gear teeth of the gears of the transmission unit G2 start meshing with each other, and the motor M2 system enters a low rigidity region. Therefore, the backlash is gradually cancelled, and the torque T2 changes to be nonlinear in response to rotation of the motor M2. According to the torque T2, the torsion amount of the motor M2 system with respect to the output shaft S changes to be nonlinear.

In the region R1, the torque T1 in a direction opposite the direction of the region R2 is applied to the motor M1 system, and increases gradually. Therefore, the torsion amount of the motor M1 system immediately after entrance to the region R1 increases abruptly, and changes to be nonlinear.

By contrast, in the motor M2 system, a predetermined limit voltage lim2 is applied and the predetermined torque T2 corresponding to the predetermined limit voltage lim2 is applied, and therefore the torsion amount of the motor M2 system corresponds to the predetermined torque T2. Accordingly, the torsion amount of the motor M2 system with respect to the output shaft S varies according to the torsion amount of the output shaft S and, as indicated in FIG. 7, the torsion amount of the motor M2 system with respect to the output shaft S increases in proportion to the voltage command value drv_in.

It is to be noted that, in a case in which the torsion amount changes in proportion to the torque, the angle is corrected with a torque value T. For example, assuming that rigidity of the rotary shaft is "k", the correction angle AO is calculated as $\Delta\theta = k \cdot T$.

The graph of FIG. 7 indicates the torsion of the output shaft S that changes in proportion to the voltage command value drv_in (i.e., the single-dot broken line 73). However, actually, the torsion of the motor M1 system and the torsion of the motor M2 system are combined to generate the torsion of the output shaft S. Therefore, there may be a case that the actual torsion amount of the output shaft S does not change in proportional to the voltage command value drv_in.

As described above, the angular deviation between the motor and the output shaft S occurs due to torsion of the rotary shaft of a motor and an output shaft, deformation of gear teeth, lateral deviation (shift) of the rotary shaft caused by deformation of a frame that supports a rotary shaft of a motor.

Figure 8:
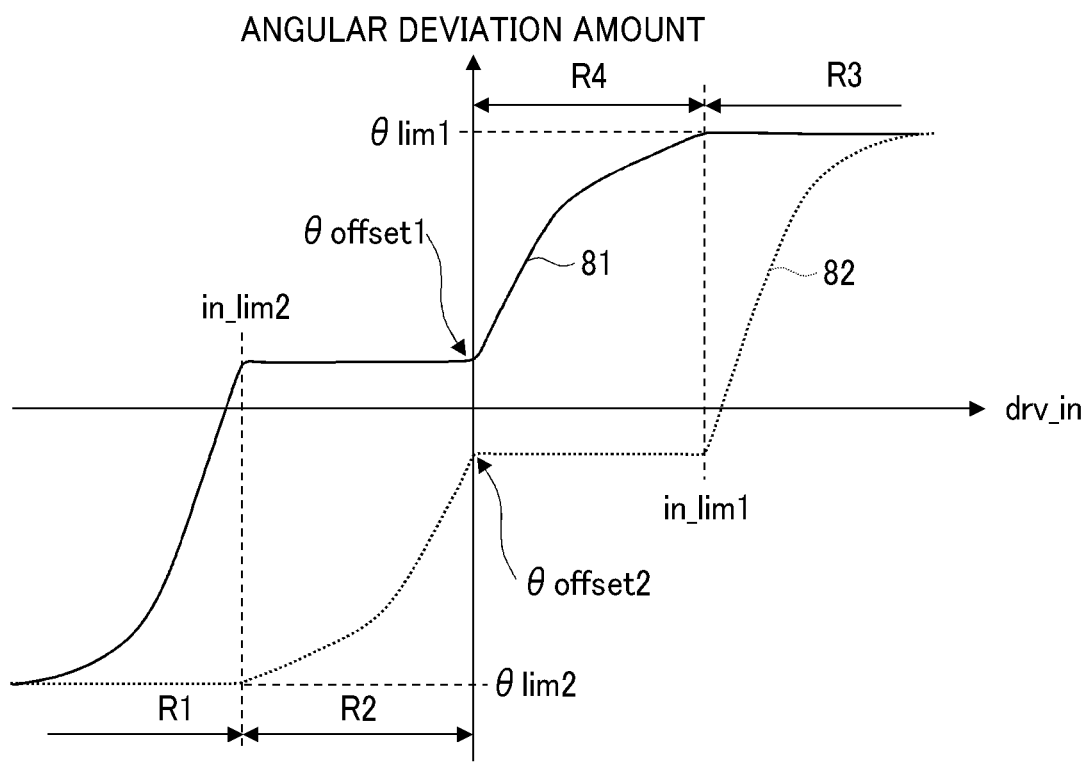
FIG. 8 is a diagram illustrating an example of an angular deviation between the output shaft and the motor.

FIG. 8 is a diagram illustrating an example of angular deviations between the output shaft S, the motor M1, and the motor M2. The horizontal axis of the graph in FIG. 8 indicates the voltage command value drv_in, and the vertical axis of the graph in FIG. 8 indicates the amount of angular deviation.

A solid line 81 indicates the angular deviation between the motor M1 and the output shaft S, and a broken line 82 indicates the angular deviation between the motor M2 and the output shaft S. A region R1 in FIG. 8 corresponds to the region R1 in FIG. 4, a region R2 in FIG. 8 corresponds to the region R2 in FIG. 4, a region R3 in FIG. 8 corresponds to the region R3 in FIG. 4, and a region R4 in FIG. 8 corresponds to the region R4 in FIG. 4.

In FIG. 8, a Mimi is an angular deviation amount between the motor M1 and the output shaft S in a case in which the limit voltage lim1 is applied. A θlim2 is an angular deviation amount between the motor M2 and the output shaft S in a case in which the limit voltage lim2 is applied. A θoffset1 is an angular deviation amount between the motor M1 and the output shaft S in a case in which the voltage command value is zero (0). A θoffset2 is an angular deviation amount between the motor M2 and the output shaft S in a case in which the voltage command value is zero (0).

In the region R4, the torsion amount of the motor M2 system corresponds to a predetermined offset voltage offset2, and therefore the angular deviation amount between the motor M2 and the output shaft S is a predetermined θoffset2. Since the torsion of the motor M1 system changes to nonlinear, the angular deviation amount between the motor M1 and the output shaft S also changes to be nonlinear according to the torsion of the motor M1 system.

Similarly, in the region R3, the angular deviation amount between the motor M2 and the output shaft S changes to nonlinear, and the angular deviation amount between the motor M1 and the output shaft S changes to the predetermined θlim1.

In the region R2, the angular deviation amount between the motor M1 and the output shaft S becomes the predetermined θoffset1, and the angular deviation amount between the motor M2 and the output shaft S changes to nonlinear.

In the region R1, the angular deviation amount between the motor M1 and the output shaft S changes to nonlinear, and the angular deviation amount between the motor M2 and the output shaft S becomes the predetermined θlim2.

The angular deviation between the motor M1 and the output shaft S and an angular deviation between the motor M2 and the output shaft S described above drive the motor M1 and the motor M2, respectively, based on a detection signal of the encoder E1 and the detection signal of the encoder E2, respectively. Consequently, in a case in which the position is controlled by the output shaft S, the accuracy in control is degraded.

In the drive device 100 according to the present embodiment of this disclosure, the motor M1 and the motor M2 are driven based on the detection signal of the encoder E2 of the motor M2 in the region R1 and the region R4. Accordingly, the position is controlled by the output shaft S. Further, the motor M1 and the motor M2 are driven based on the detection signal of the encoder E1 of the motor M1 in the region R2 and the region R3. Accordingly, the position is controlled by the output shaft S. Accordingly, degradation of accuracy in position control by the output shaft S is prevented.

For example, a detected value of an angle indicated by a detection signal ENC1 of the encoder E1 of the motor M1 is represented as "φ1", a detected value of an angle indicated by a detection signal ENC2 of the encoder E2 of the motor M2 is represented as "φ2", and a detected value of an angle of an encoder used for the position control of the output shaft S is represented as "ϕ". It is to be noted that, in order to simplify the description, the detected value of an angle is simply referred to as the "detected value."

In the region R1, the drive device 100 calculates the detected value ϕ by the following Equation 1.

$$\phi = \phi2 - \theta\text{lim}2 \qquad \text{Equation 1.}$$

In the region R1, the angular deviation amount between the motor M2 and the output shaft S is a predetermined θlim2 regardless of the voltage command value drv_in. The drive device 100 corrects the detection value ϕ2 using the predetermined θlim2 by Equation 1, and acquires the detection value ϕ from which the influence of the angular deviation between the motor M2 and the output shaft S has been removed. The drive device 100 performs the position control by the output shaft S by using this detected value ϕ, so that degradation of control accuracy is prevented.

Further, according to Equation 1, since the offset value θlim2 of the angular deviation that was measured in advance is subtracted, even if there is a difference in the offset value of the detection value ϕ between the regions of the regions R1 to R4, the difference is removed, and therefore continuity of the detection value ϕ between the regions of the regions R1 to R4 is secured.

Similarly, the drive device 100 calculates the detected value ϕ in the region R2 by the following Equation 2, the detected value ϕ in the region R3 by the following Equation 3, and the detected value ϕ in the region R4 by the following Equation 4.

$$\phi = \phi1 - \theta\text{offset}1 \qquad \text{Equation 2.}$$

$$\phi = \phi1 - \theta\text{lim}1 \qquad \text{Equation 3.}$$

$$\phi = \phi2 - \theta\text{offset}2 \qquad \text{Equation 4.}$$

The effect of calculating the detected values ϕ by Equations 2, 3, and 4 is the same as the effect of calculating the detected value ϕ by Equation 1 as described above.

Figure 9:
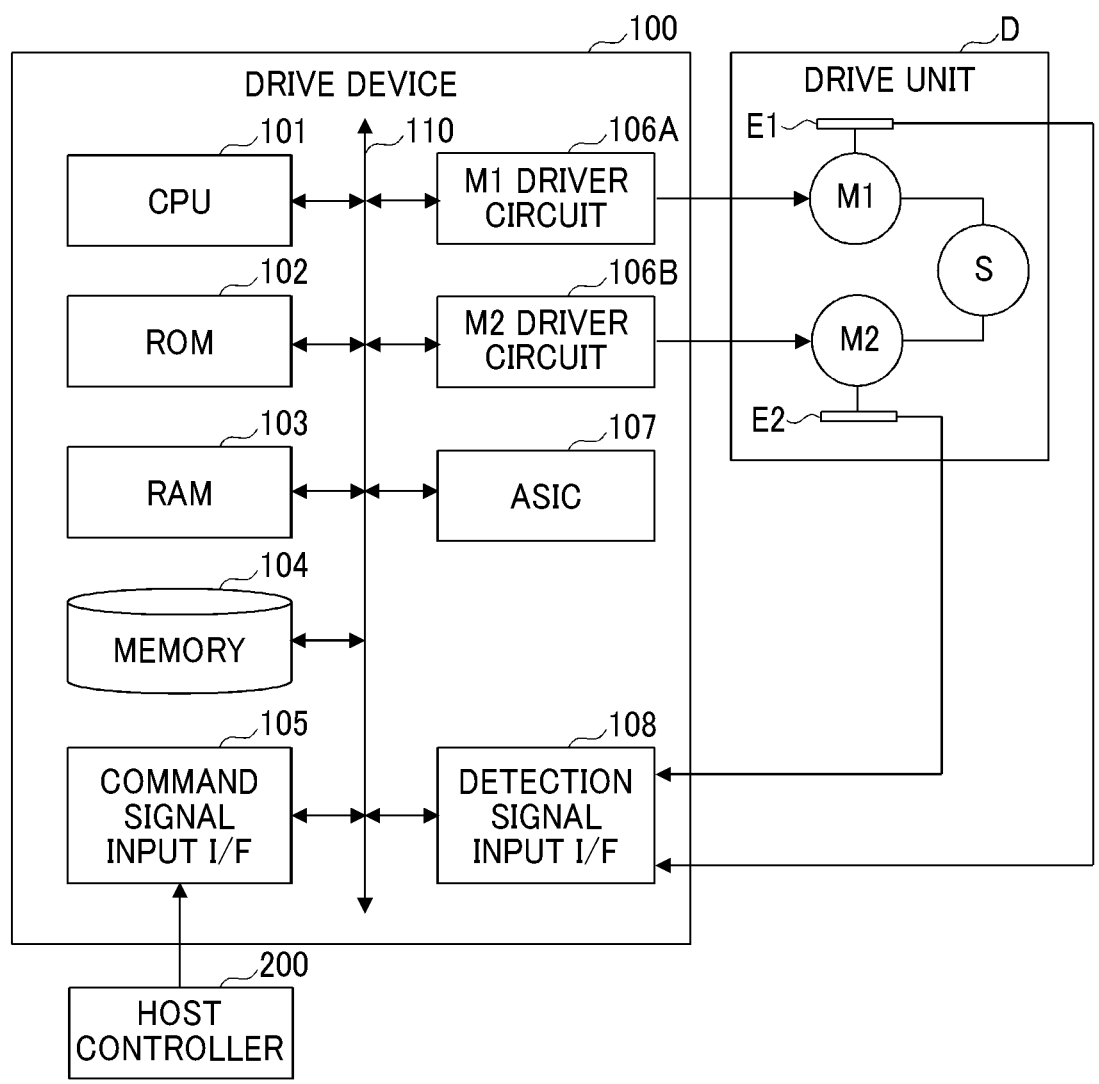
FIG. 9 is a block diagram illustrating an example of a hardware configuration of a drive device according to Embodiment 1.

FIG. 9 is a block diagram illustrating an example of a hardware configuration of the drive device 100 according to Embodiment 1 of this disclosure.

The drive device 100 includes a central processing unit (CPU) 101, a read only memory (ROM) 102, a random access memory (RAM) 103, a memory 104, and a command signal input interface (I/F) 105. The drive device 100 further includes an M1 driver circuit 106A, an M2 driver circuit 106B, an application specific integrated circuit (ASIC) 107, and a detection signal input interface (I/F) 108. These units and components are electrically connected to each other via a system bus 110.

The CPU 101 centrally controls the operations of the drive device 100. The CPU 101 executes a program stored in the ROM 102 using the RAM 103 as a work area. By so doing, the total operations of the drive device 100 are controlled to provide various functions described below.

The memory 104 stores correction values such as θlim1, θlim2, θoffset1, and θoffset2. The correction value is used to calculate a detection value ϕ to be used for position control of the output shaft S from the detection value of the encoder E1 and the detection value of the encoder E2. The memory 104 is, for example, a non-volatile memory. The correction value may be stored in the ROM 102, and the function of the memory 104 may be performed in the ROM 102.

The command signal input I/F 105 is an interface that is electrically connected to the host controller 200 to receive data or signals from the host controller 200. The host controller 200 is a master controller that gives the drive device 100 a command to cause the drive device 100 to drive the drive unit D. The drive device 100 receives an electrical signal indicating a drive command from the host controller 200 via the command signal input I/F 105.

The M1 driver circuit 106A is an electric circuit that is electrically connected to the motor M1 of the drive unit D to apply a voltage to drive the motor M1.

The M2 driver circuit 106B is an electric circuit that is electrically connected to the motor M2 of the drive unit D to apply a voltage to drive the motor M2

The ASIC 107 is an integrated circuit for generating a pulse width modulation (PWM) signal to be output to the M1 driver circuit 106A and the M2 driver circuit 106B.

The detection signal input I/F 108 is an interface electrically connected to the encoder E1 and the encoder E2 to receive data or signals from the encoder E1 and the encoder E2. The drive device 100 receives an electrical signal indicating the angle of the motor M1 from the encoder E1 via the detection signal input I/F 108, and receives an electrical signal indicating the angle of the motor M2 from the encoder E2 via the detection signal input I/F 108.

The drive device 100 provides the functional configuration described below by the hardware configuration illustrated in FIG. 9.

Figure 10:
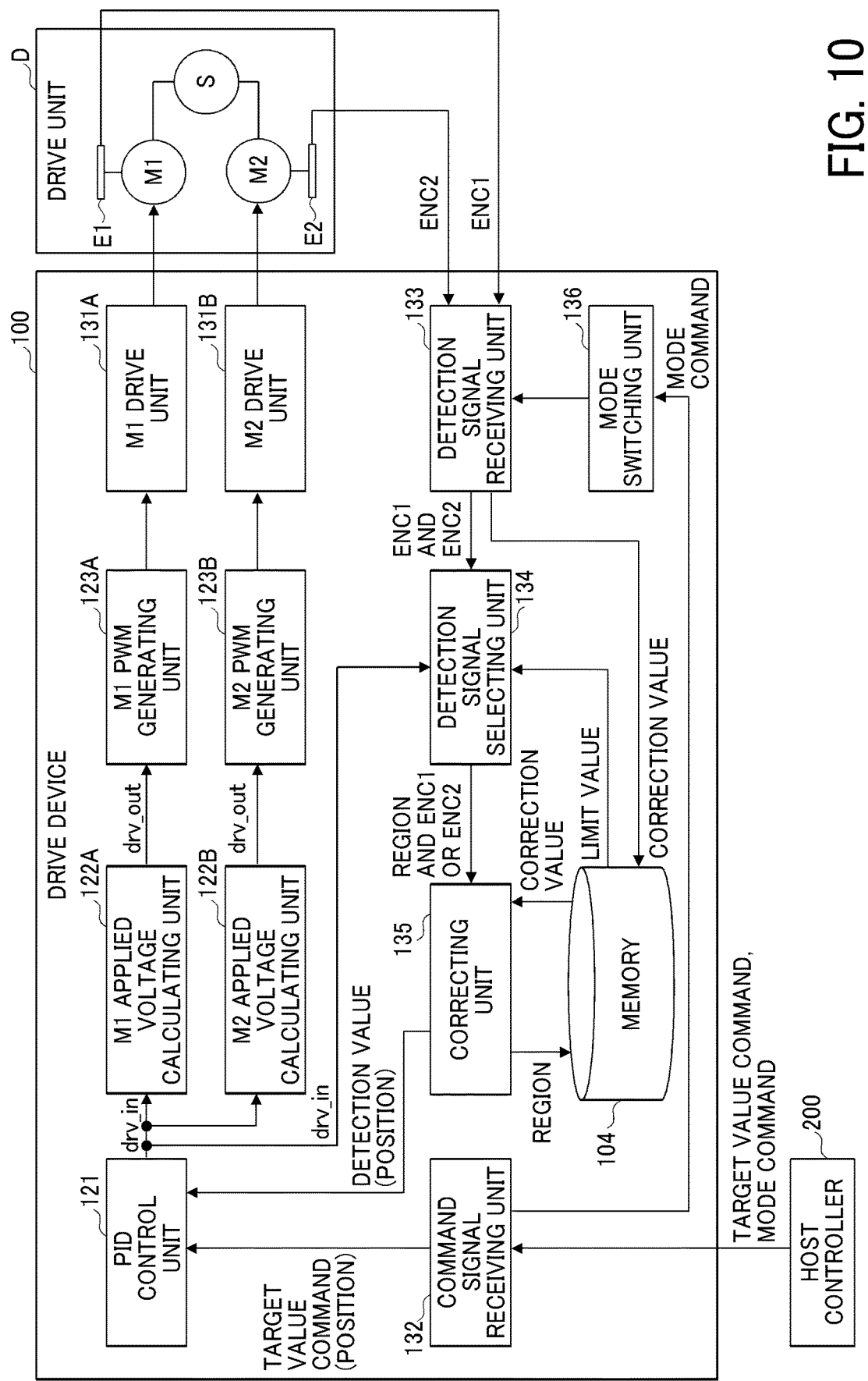
FIG. 10 is a functional block diagram illustrating an example of components of the drive device according to Embodiment 1.

FIG. 10 is a functional block diagram illustrating an example of components of the drive device 100 according to Embodiment 1 of this disclosure. It is to be noted that each functional block of the drive device 100 illustrated in FIG. 10 is conceptual, and does not have to be physically configured as illustrated. The entire of each function block or a part each function block may be configured to be functionally or physically dispersed or coupled in arbitrary units. The entire or a part of each processing function performed in each functional block of the drive device 100 may be realized by a program executed by the above-described CPU 101 or may be realized as hardware by the wired logic.

The drive device 100 includes a proportional integral differential (PID) control unit 121, an M1 applied voltage calculating unit 122A, an M2 applied voltage calculating unit 122B, an M1 PWM generating unit 123A, and an M2 PWM generating unit 123B. The drive device 100 further includes an M1 drive unit 131A, an M2 drive unit 131B, a command signal receiving unit 132, a detection signal receiving unit 133, a detected signal selecting unit 134, a correcting unit 135, a mode switching unit 136, and the memory 104.

The command signal receiving unit 132 receives a target value command signal from the host controller 200 and outputs the target value command signal to the PID control unit 121. In the present embodiment, the target value is, for example, a target value of the position of the output shaft S. Further, the command signal receiving unit 132 receives, from the host controller 200, a mode command signal for switching the operation mode of the drive device 100 to a drive mode or to a correction value acquisition mode, and outputs the mode command signal to the mode switching unit 136. The command signal receiving unit 132 is realized by the command signal input I/F 105.

The detection signal receiving unit 133 receives the detection signal ENC1 indicating the angle of the motor M1, from the encoder E1 and receives the detection signal ENC2 indicating the angle of the motor M2, from the encoder E2. In a case in which the operation mode of the drive device 100 is the drive mode, the detection signal receiving unit 133 outputs the detection signal ENC1 received from the encoder E1 and the detection signal ENC2 received from the encoder E2, to the detected signal selecting unit 134. In a case in which the operation mode of the drive device 100 is the corrected value acquisition mode, the detection signal receiving unit 133 outputs the detection value ϕ1 indicated by the detection signal ENC1 received from the encoder E1 and the detection value ϕ2 indicated by the detection signal ENC2 received from the encoder E2, as respective correction values, to the memory 104. The detection signal receiving unit 133 is realized by the detection signal input I/F 108.

The detected signal selecting unit 134 inputs the voltage command value drv_in that is output from the PID control unit 121 for each control cycle. In addition, with reference to the memory 104, the positive limit value in_lim1 and the negative limit value in_lim2 are acquired. Based on the voltage command value drv_in, the positive limit value in_lim1, and the negative limit value in_lim2, it is determined which of the regions R1 through R4 falls on the region of the voltage command value (see FIG. 4). The detected signal selecting unit 134 inputs the detection signal ENC1 and the detection signal ENC2 from the detection signal receiving unit 133. Then, according to the determined region of the voltage command value, the detected signal selecting unit 134 selects one signal from the detection signal ENC1 and the detection signal ENC2, as a signal to be used for control of the output shaft S. The detected signal selecting unit 134 outputs the one signal selected from the detection signal ENC1 and the detection signal ENC2, and a signal indicating the determined region, to the correcting unit 135. The detected signal selecting unit 134 is an example of a "detection signal selector" executed by the CPU 101 that functions as "circuitry."

The correcting unit 135 refers to the memory 104 based on the signal indicating the determined region, and acquires a correction value corresponding to the determined region. The correction value includes θlim1, θlim2, θoffset1, and θoffset2. The correcting unit 135 calculates the detection value ϕ of the encoder by using any one of the above-described equations, which are Equation 1 to Equation 4 according to the determined region, based on the detection value ϕ1 indicated by the selected detection signal ENC1, the detection value ϕ2 indicated by the selected detection signal ENC2, and the correction value. The correcting unit 135 calculates the detected value of the position of the output shaft S from the detection value ϕ, and outputs the detected value to the PID control unit 121. The correcting unit 135 is an example of a "corrector" executed by the CPU 101 that functions as "circuitry."

It is to be noted that there may be a case that an angular deviation due to a mounting error of a motor and an encoder that is regardless of torque, between the output shaft S and the motor M1 and the output shaft S and the motor M2. The angular deviation caused along with such a mounting error may be previously measured and stored in the memory 104 and the correcting unit 135 may correct the angular deviation caused along with the mounting error.

The mode switching unit 136 switches a direction in which the detection signal receiving unit 133 outputs the detection signal ENC1 and the detection signal ENC2, to any one of the detected signal selecting unit 134 and the memory 104, according to the mode command signal that is inputted from the command signal receiving unit 132.

The detected signal selecting unit 134, the correcting unit 135, and the mode switching unit 136 are realized by the CPU 101, for example.

In a case in which the operation mode of the drive device 100 is the corrected value acquisition mode, under a predetermined condition or conditions, the memory 104 receives the detection value ϕ1 indicated by the detection signal ENC1 and the detection value ϕ2 indicated by the detection signal ENC2, from the detection signal receiving unit 133, and stores the detection value ϕ1 and the detection value ϕ2 as a correction value. In addition, in a case in which the operation mode of the drive device 100 is the drive mode, the memory 104 outputs the correction value when the operation mode of the drive device 100 is the drive mode, the memory 104 outputs the correction value to the correcting unit 135 according to the signal indicating the region of the voltage command value input from the correcting unit 135. Furthermore, the memory 104 stores the positive limit value in_lim1 and the negative limit value in_lim2, defined in advance. Therefore, the memory 104 is referred to by the detected signal selecting unit 134 in a case in which the operation mode of the drive device 100 is the drive mode.

The memory 104 may store, for example, a formula such as Equations 1 through 4 instead of the correction value, and may output the formula to the correcting unit 135 according to the signal indicating the region of the voltage command value. It is to be noted that the memory 104 is an example of a "memory" that store values.

The PID control unit 121 that functions as circuitry calculates the voltage command value drv_in by PID control so that the detected value of the position of the output shaft S approaches the target value. A signal indicating the target value of the position of the output shaft S is inputted from the host controller 200 to the PID control unit 121 via the command signal receiving unit 132. A signal indicating the detected value of the position of the output shaft S is inputted from the correcting unit 135 to the PID control unit 121. The PID control unit 121 outputs the calculated voltage command value drv_in to the M1 applied voltage calculating unit 122A, the M2 applied voltage calculating unit 122B, and the detected signal selecting unit 134. The PID control unit 121 is an example of a "controller" executed by the CPU 101 that functions as "circuitry."

The M1 applied voltage calculating unit 122A calculates the applied voltage drv_out of the motor M1 based on the input voltage command value drv_in, and outputs a signal indicating the voltage value to the M1 PWM generating unit 123A.

The M2 applied voltage calculating unit 122B calculates the applied voltage drv_out of the motor M2 based on the input voltage command value drv_in, and outputs a signal indicating the voltage value to the M2 PWM generating unit 123B.

The relationship between the voltage command value drv_in and the applied voltage drv_out in the M1 applied voltage calculating unit 122A and the M2 applied voltage calculating unit 122B is set in advance, as illustrated in FIG. 4.

The PID control unit 121, the M1 applied voltage calculating unit 122A, and the M2 applied voltage calculating unit 122B are realized by, for example, the CPU 101.

The M1 PWM generating unit 123A receives the applied voltage from the M1 applied voltage calculating unit 122A, generates a PWM signal according to the received applied voltage, and outputs the PWM signal to the M1 drive unit 131A.

The M2 PWM generating unit 123B receives the applied voltage from the M2 applied voltage calculating unit 122B, generates a PWM signal according to the received applied voltage, and outputs the PWM signal to the M2 drive unit 131B.

The M1 PWM generating unit 123A and the M2 PWM generating unit 123B are realized by, for example, the ASIC 107.

The M1 drive unit 131A receives the PWM signal from the M1 PWM generating unit 123A, and applies an applied voltage corresponding to the PWM signal to the motor M1. The M2 drive unit 131B receives the PWM signal from the M2 PWM generating unit 123B, and applies an applied voltage corresponding to the PWM signal to the motor M2. Thus, the motor M1 and the motor M2 are driven, and the output shaft S is driven via the transmission unit G1 and the transmission unit G2

The M1 drive unit 131A is realized by the M1 driver circuit 106A, and the M2 drive unit 131B is realized by the M2 driver circuit 106B.

Referring back to FIG. 4, for example, the motor M2 applies the drive torque to the output shaft S in the region R2 of FIG. 4, and the motor M1 reduces the backlash between the motor M2 and the output shaft S.

In the region R2, the detected signal selecting unit 134 selects the detection signal ENC1 of the encoder E1, and the PID control unit 121 uses the detection signal ENC1 for control. For example, when transitioning from the region R4 to the region R2 or from the region R1 to the region R2, the detection signal used by the PID control unit 121 for control is switched from the detection signal ENC2 to the detection signal ENC1 by the detected signal selecting unit 134. As described above, the detected signal selecting unit 134 functions as a switcher.

It is to be noted that the detected signal selecting unit 134 is an example of a "detection signal switcher" executed by the CPU 101 that functions as "circuitry."

Figure 11:
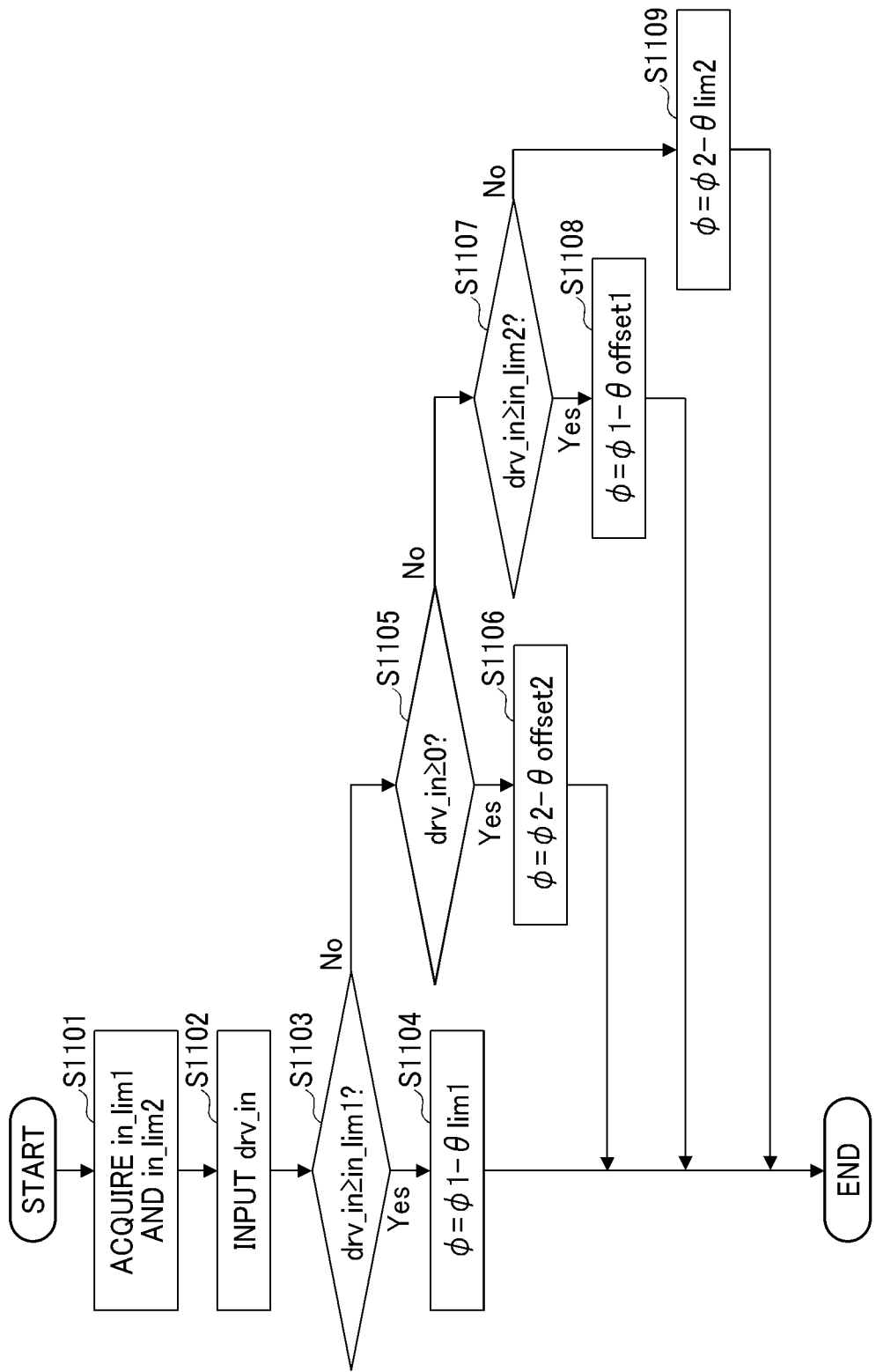
FIG. 11 is a flowchart of correcting processes of an angular deviation of the drive device according to Embodiment 1.

Next, FIG. 11 is a flowchart of performing correcting processes of the angular deviation between the motor M1 and the output shaft S and between the motor M2 and the output shaft S, by the drive device 100 according to Embodiment 1.

First, the detected signal selecting unit 134 refers to the memory 104 to acquire the positive limit value in_lim1 and the negative limit value in_lim2 (step S1101).

Then, the detected signal selecting unit 134 inputs the voltage command value drv_in that is outputted by the PID control unit 121 for each control cycle (step S1102).

Then, the detected signal selecting unit 134 determines whether the voltage command value drv_in is equal to or greater than the positive limit value in_lim1 (step S1103). In a case in which the voltage command value drv_in is equal to or greater than the positive limit value in_lim1 (YES in step S1103), the detected signal selecting unit 134 selects the detection signal ENC1, and outputs the detection signal ENC1 and a signal indicating the region R3, to the correcting unit 135.

The correcting unit 135 refers to the memory 104, based on the signal indicating the region R3, to acquire the correction value correction value θlim1 according to the region R3. The correcting unit 135 corrects the detection value φ1 indicated by the detection signal ENC1 according to Equation 3, and calculates the detection value φ (step S1104). The correcting unit 135 calculates the detection value of the position of the output shaft S according to the detection value φ, and outputs the calculated detection value of the position of the output shaft S to the PID control unit 121.

In a case in which the voltage command value drv_in is less than the positive limit value in_lim1 (NO in step S1103), the detected signal selecting unit 134 determines whether or not the voltage command value drv_in is zero (0) or greater (step S1105). In a case in which the voltage command value drv_in is zero (0) or greater (YES in step S1105), the detected signal selecting unit 134 selects the detection signal ENC2 and outputs the detection signal ENC2 and a signal indicating the region R4 to the correcting unit 135.

The correcting unit 135 refers to the memory 104, based on the signal indicating the region R4, and acquires the correction value θoffset2 corresponding to the region R4. The correcting unit 135 corrects the detection value φ2 indicated by the detection signal ENC2 according to Equation 4, and calculates the detection value φ (step S1106). The correcting unit 135 calculates the detection value of the position of the output shaft S according to the detection value φ, and outputs the calculated detection value of the position of the output shaft S to the PID control unit 121.

In a case in which the voltage command value drv_in is less than zero (0) (NO in step S1105), the detected signal selecting unit 134 determines whether or not the voltage command value drv_in is equal to or greater than the negative limit value in_lim2 (step S1107). In a case in which the voltage command value drv_in is equal to or greater than the negative limit value in_lim2 (YES in step S1107), the detected signal selecting unit 134 selects the detection signal ENC1 and outputs the detection signal ENC1 and a signal indicating the region R2 to the correcting unit 135.

The correcting unit 135 refers to the memory 104, based on the signal indicating the region R2, to acquire the correction value θoffset1 corresponding to the region R2. The correcting unit 135 corrects the detection value φ1 indicated by the detection signal ENC1 according to Equation 2 to calculate the detection value φ (step S1108). The correcting unit 135 calculates the detection value of the position of the output shaft S according to the detection value φ, and outputs the calculated detection value of the position of the output shaft S to the PID control unit 121.

In a case in which the voltage command value drv_in is less than in_lim2 (step S1107), the detected signal selecting unit 134 selects the detection signal ENC2 and outputs the detection signal ENC2 and a signal indicating the region R1, to correcting unit 135.

The correcting unit 135 refers to the memory 104, based on the signal indicating the region R1, to acquire the correction value θlim2 corresponding to the region R1. The correcting unit 135 corrects the detection value φ2 indicated by the detection signal ENC1 according to Equation 1, and calculates the detection value φ (step S1109). The correcting unit 135 calculates the detection value of the position of the output shaft S according to the detection value φ, and outputs the calculated detection value of the position of the output shaft S to the PID control unit 121.

As described above, the detected signal selecting unit 134 and the correcting unit 135 acquire the detection value φ from which the influence of the angular deviation between the motor M1 of the output shaft S and the angular deviation between the motor M2 and the output shaft S are removed.

FIG. 12 is a flowchart of an acquiring process of the correction value of the drive device 100 according to Embodiment 1 of this disclosure.

First, the command signal receiving unit 132 receives a command signal indicating that the operation mode is set to the correction value acquisition mode, from the host controller 200, and outputs a signal indicating the setting of the operation mode to the PID control unit 121 and the mode switching unit 136 (step S1201).

Then, the PID control unit 121 sets the voltage command value drv_in to zero (0), and outputs the voltage command value drv_in to the M1 applied voltage calculating unit 122A and the M2 applied voltage calculating unit 122B (step S1202). The M1 applied voltage calculating unit 122A, the M1 PWM generating unit 123A, and the M1 drive unit 131A drive the motor M1 according to the voltage command value drv_in. The M2 applied voltage calculating unit 122B, the M2 PWM generating unit 123B, and the M2 drive unit 131B drive the motor M2 according to the voltage command value drv_in.

The mode switching unit 136 switches the output destination of the detection value φ1 indicated by the detection signal ENC1 and the detection value φ2 indicated by the detection signal ENC2, to the memory 104 (step S1203).

Then, the detection signal receiving unit 133 outputs the detection value φ1 indicated by the detection signal ENC1 to the memory 104, and the memory 104 stores the detection value φ1 as the correction value θoffset1. The detection signal receiving unit 133 also outputs the detection value φ2 indicated by the detection signal ENC2 to the memory 104, and the memory 104 stores the detection value φ2 as the correction value θoffset2 (step S1205).

Next, the PID control unit 121 sets the voltage command value drv_in to the positive limit value in_lim1 and outputs the voltage command value drv_in to the M1 applied voltage calculating unit 122A (step S1206). The M1 applied voltage calculating unit 122A, the M1 PWM generating unit 123A, and the M1 drive unit 131A drive the motor M1 according to the voltage command value drv_in Next, the detection signal receiving unit 133 outputs the detection value φ1 indicated by the received detection signal ENC1 to the memory 104, and the memory 104 stores the detection value φ1 as the correction value θlim1 (step S1207).

Next, the PID control unit 121 sets the voltage command value drv_in to in_lim2 and outputs the voltage command value drv_in to the M2 applied voltage calculating unit 122B (step S1208). The M2 applied voltage calculating unit 122B, the M2 PWM generating unit 123B, and the M2 drive unit 131B drive the motor M2 according to the voltage command value drv_in.

Next, the detection signal receiving unit 133 outputs the detection value φ2 indicated by the received detection signal ENC2 to the memory 104, and the memory 104 stores the detection value φ2 as the correction value θlim2 (step S1209).

As described above, the drive device 100 acquires the correction value θoffset1, the correction value θoffset2, the correction value θlim1, and the correction value θlim2 and store the correction values in the memory 104.

FIG. 13 is a diagram illustrating an example of a table indicating the relation of command values and the correction values according to Embodiment 1.

The table illustrated in FIG. 13 is stored in the memory 104. The correcting unit 135 acquires the correction value with reference to the memory 104 based on the region of the voltage command value drv_in.

Here, a description is given of the effect of selection of the detection signal of the encoder by the drive device 100 according to the present embodiment of this disclosure.

Figure 14:
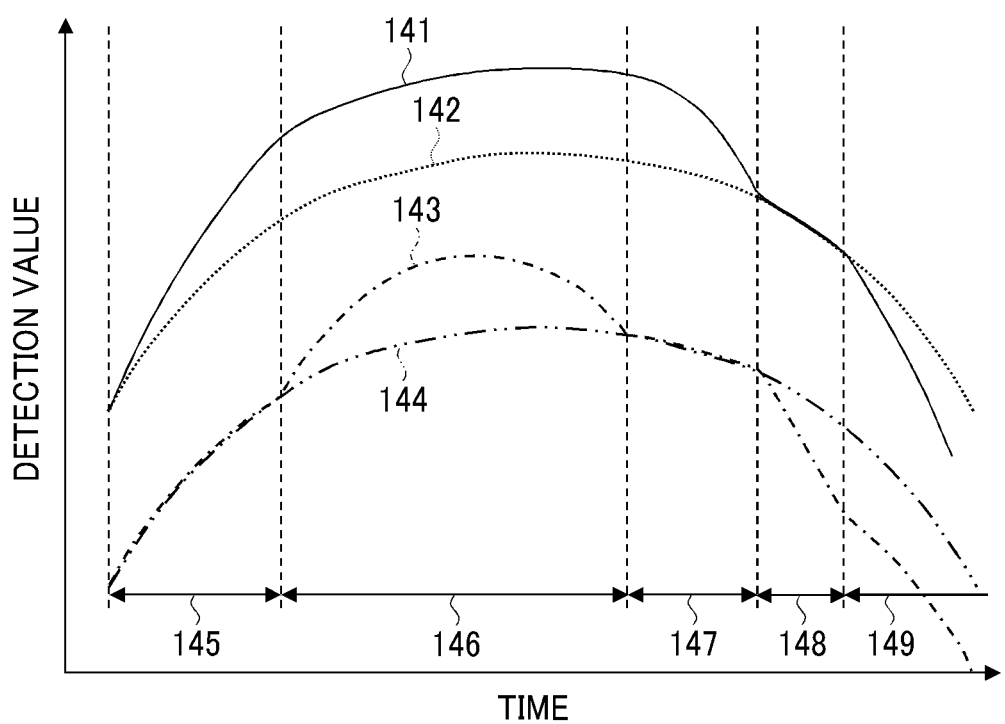
FIG. 14 is a diagram illustrating an example of a change of a detected value of an angle detected by the encoder of Embodiment 1.

FIG. 14 is a diagram illustrating an example of a change of an angle detected by the encoder along with driving of the output shaft S according to Embodiment 1. The horizontal axis indicates time, and the vertical axis indicates the detected value of the angle.

The time domain 145 is a time domain in a case in which the voltage command value drv_in is the region R4, and the time domain 146 is a time domain in a case in which the voltage command value drv_in is the region R3. The time domain 147 is a time domain in a case in which the voltage command value drv_in is the region R4, and the time domain 148 is a time domain in a case in which the voltage command value drv_in is the region R2. The time domain 149 is a time domain in a case in which the voltage command value drv_in is the region R1. In the example illustrated in FIG. 14, the voltage command value drv_in changes, according to passage of time, in the order of the region R4, the region R3, the region R4, the region R2, and the region R1.

A solid line 141 is a detection value φ1 detected by the encoder E1 when torque is applied. A broken line 142 is a detection value φ1 detected by the encoder E1 when no torque is applied. A one-dot dashed line 143 is a detection value φ2 detected by the encoder E2 when torque is applied. A two-dot dashed line 144 is a detection value φ2 detected by the encoder E2 when no torque is applied.

When no torque is applied, no angular deviation is generated in both the motors M1 and M2, and therefore both the detection value φ1 and the detection value φ2 become normal outputs including no angular deviation. By contrast, when torque is applied, an angular deviation is included in the detection value φ1 and the detection value φ2 according to the change of the region of the voltage command value drv_in.

In the time domain 145 (the region R4), the time domain 147 (the region R4), and the time domain 149 (the region R1), the detection value φ1 indicated by the solid line 141 includes an angular deviation that changes in a nonlinear shape and indicates a different tendency from the broken line 142. By contrast, the detection value φ2 indicated by the one-dot dashed line 143 has a constant angular deviation, and therefore indicates the same tendency as the two-dot dashed line 144. Accordingly, in these time domains, by using the detection value φ2, the detection value φ from which the influence of the angular deviation is removed is obtained.

In the time domain 146 (the region R3) and the time domain 148 (the region R2), the detection angle φ1 indicated by the solid line 141 has a constant angular deviation, and therefore indicates the same tendency as the broken line 142. By contrast, the detection angle φ2 indicated by the one-dot dashed line 143 includes an angular deviation that changes to a nonlinear shape, and indicates a tendency different from the two-dot dashed line 144. Therefore, in these time domains, by using the detection value φ1, the detection value φ from which the influence of the angular deviation is removed is obtained.

As described above, according to Embodiment 1, in the control of a multi-motor such as a double motor, the influence of the angular deviation between the motor and the output shaft due to torsion of the rotary shaft of a motor or an output shaft and deformation of the tooth or teeth of a gear is removed, so that the angle of the output shaft is detected accurately based on the detection signal of a motor shaft encoder. By using an accurate detection value of the angle of the output shaft, the highly accurate position control is provided by the output shaft.

In a case in which a reduction gear having a reduction ratio H is used as a transmission unit, for example, Equation 5 described below represents a relation between the angle θm of the motor and the angle θout of the output shaft.

$$\theta out = \theta m/H \qquad \text{Equation 5.}$$

Since the angle θm of the motor is divided by the reduction ratio H, the resolution of the angle of the output shaft is increased and the torque is increased simultaneously. Further, as the speed of the reduction gear is reduced at multiple stages by using multiple gears, the reduction ratio H increases. Accordingly, the resolution of the angle of the output shaft is enhanced to increase the torque.

However, as the number of gears for multistage speed reduction increases, the angular deviation due to torsion of a rotation torsion axis of a motor or an output shaft or deformation of tooth or teeth of a gear or gears increases, which may result in degradation of accuracy in position control by the output shaft.

The configuration according to the present embodiment removes the influence of an angular deviation due to torsion of the rotary shaft of a motor or an output shaft and deformation of tooth or teeth of a gear or gears. Therefore, in the multistage speed reduction by a reduction gear, while the resolution of the angle of an output shaft ration by the reduction gear is increased to increase the torque, the position control by the output shaft is performed accurately. In addition, since the detection signal of the motor shaft encoder is used to detect and control the angle before the speed is reduced by the reduction gear, the position control by the output shaft is performed with high accuracy without using an expensive encoder having high performance.

Furthermore, according to the present embodiment, a stepping motor used in a mechanism in which angle control is performed may be replaced by a DC brushless motor, a motor with a DC brush, or an AC motor. This configuration is widely applicable not only to industrial robots but also mechanisms that performs angle adjustment of, for example, door mirrors of a vehicle such as a car or satellite antennas, and therefore provides an angle adjustment mechanism having an enhanced versatility.

It is to be noted that, even though this disclosure was described regarding the position control by an output shaft in the present embodiment, this disclosure is not limited to the above-described control. For example, this disclosure is applicable to the speed control by an output shaft.

Embodiment 2

Next, a description is given of an example of another drive device 100a according to Embodiment 2 with reference to a drawing.

It is to be noted that, in a case in which the units and components of the drive device 100a according to Embodiment 2 are the same as the units and components of the drive device 100 according to Embodiment 1, the description of the units and components of the drive device 100a of Embodiment 2 may be omitted.

In the drive device 100 according to Embodiment 1, the correcting unit 135 corrects the detection value $\phi1$ or the detection value $\phi2$ by using a set of the correction values $\theta$offset1, $\theta$offset2, $\theta$lim1, and $\theta$lim2. However, in actual control of the output shaft S, the influence of gravity differs depending on the output conditions such as the rotation direction, angle, and speed of the output shaft S, and the load torque may change. In a case in which the load torque changes, the appropriate correction value changes.

For these reasons, in Embodiment 2, a set of multiple correction values corresponding to the operating condition of the output shaft S is stored in the memory, and the set of correction values is selected according to the operating condition of the output shaft S. Accordingly, the correction using appropriate correction values is performed.

By contrast, the stiffness of a transmission unit and an output shaft may change with time. If the stiffness changes, the appropriate correction value also changes. For these reasons, in Embodiment 2, the correction value is updated according to, for example, a regular update command of a correction value based on the elapsed time measured by the timer.

Figure 15:
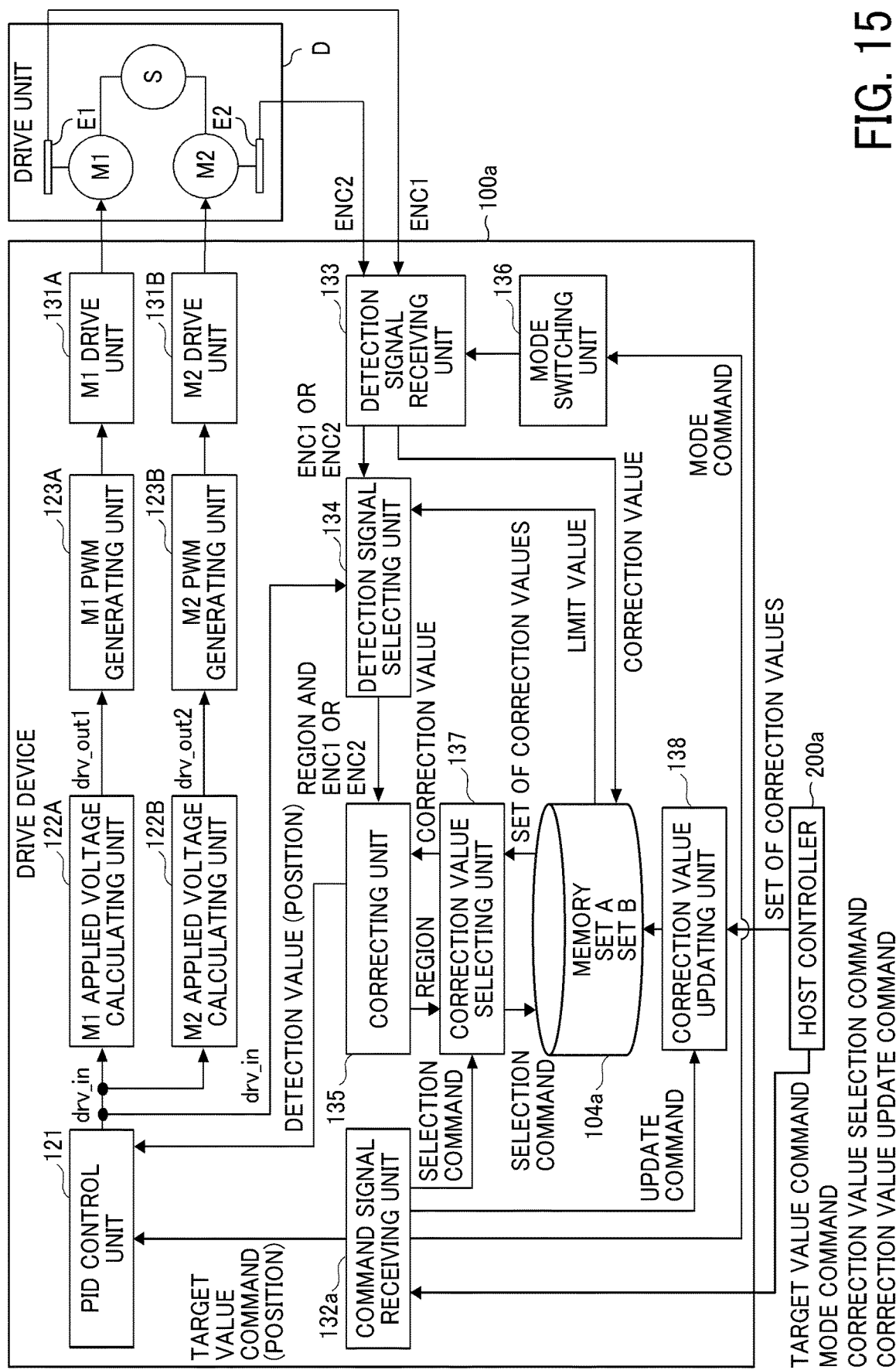
FIG. 15 is a functional block diagram illustrating an example of components of a drive device according to Embodiment 2.

FIG. 15 is a functional block diagram illustrating an example of components of the drive device 100a according to Embodiment 2.

The drive device 100a includes a memory 104a, a command signal receiving unit 132a, a correction value selecting unit 137, and a correction value updating unit 138.

The memory 104a stores a set of correction values according to the operating condition of the output shaft. For example, the memory 104a stores a correction value set A according to the operating condition A of the output shaft and a correction value set B according to the operating condition B of the output shaft. The correction value set A includes the correction values $\theta$offset1A, $\theta$offset2A, $\theta$lim1A, and $\theta$lim2A. The correction value set B includes the correction values $\theta$offset1B, $\theta$offset2B, $\theta$lim1B, and $\theta$lim2B. It is to be noted that the memory 104a may store Equations 1 through 4 instead of the correction value sets.

The command signal receiving unit 132a receives the target value command signal from a host controller 200a and outputs the target value command signal to the PID control unit 121. In the present embodiment, the target value is, for example, a target value of the position of the output shaft S.

The command signal receiving unit 132a receives a mode command signal for switching the operation mode of the drive device 100a to the drive mode or the correction value acquisition mode from the host controller 200a, and outputs the mode command signal to the mode switching unit 136.

The command signal receiving unit 132a receives, from the host controller 200, a selection command signal of a correction value set according to the operating condition of the output shaft, and outputs the selection command signal to the correction value selecting unit 137. Further, the command signal receiving unit 132a receives the update command signal of the correction value from the host controller 200a and outputs the update command signal to the correction value updating unit 138.

The command signal receiving unit 132a is formed by the command signal input I/F 105.

The correction value selecting unit 137 acquires a correction value set or an equation with reference to the memory 104a based on the selection command input from the command signal receiving unit 132a. Further, the correction value selecting unit 137 receives a signal indicating the determined region from the correcting unit 135, and outputs a correction value corresponding to the region to the correcting unit 135. The correction value selecting unit 137 is an example of a "correction value selector" executed by the CPU 101 that functions as "circuitry."

The correction value updating unit 138 inputs a new correction value from the host controller 200a in accordance with the update command inputted from the command signal receiving unit 132a, and rewrites the correction value stored in the memory 104a with the new correction value. Alternatively, the correction value updating unit 138 inputs a new equation from the host controller 200a in response to the update command inputted from the command signal receiving unit 132a, and rewrites the equation stored in the memory 104a into a new equation. As a result, the correction value or the equation stored in the memory 104a is updated. The correction value updating unit 138 is an example of an "updating unit" executed by the CPU 101 that functions as "circuitry."

The correction value selecting unit 137 and the correction value updating unit 138 are formed by, for example, the CPU 101.

It is to be noted that an example of the functional configuration in which a new correction value or an equation is input from the host controller 200a is described in the present embodiment, but this disclosure is not limited to this functional configuration. For example, the correction value updating unit 138 outputs a mode command to the mode switching unit 136 in response to the update command. The mode switching unit 136 switches the output destination of the detection value $\phi 1$ indicated by the detection signal ENC1 and the detection value $\phi 2$ indicated by the detection signal ENC2, to the memory 104 according to the input mode command. Then, the memory 104a may update the stored correction value or equation with the detection value $\phi 1$ indicated by the input detection signal ENC1 and the detection value $\phi 2$ indicated by the input detection signal ENC2.

As described above, in the present embodiment, the multiple correction value set or the equation, stored in the memory 104a, is selected according to the operating conditions of the output shaft, so that correction is performed by using an appropriate correction value. In addition, by updating the correction value or the equation in response to a regular update command of a correction value, the rigidity of the transmission unit and the output shaft is corrected with an appropriate correction value or equation, according to the change of time.

It is to be noted that the other effects of the configuration according to Embodiment 2 are the same as the effects of the configuration according to Embodiment 1.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A drive device comprising:
a first motor including a first rotation detector configured to measure a first rotation angle of the first motor and output the measured first rotation angle as a detection signal,
the first motor configured to rotate a driven shaft to apply a driving torque to the driven shaft;
a second motor including a second rotation detector provided separately from the first rotation detector, the second rotation detector being configured to measure a second rotation angle of the second motor and output the measured second rotation angle as a detection signal,
the second motor configured to rotate the driven shaft to reduce backlash between the first motor and the driven shaft; and
circuitry configured to control the first motor and the second motor, based on the detection signal of the second rotation detector,
wherein the circuitry is configured to switch the detection signal of the first rotation detector and the detection signal of the second rotation detector, both the detection signal of the first rotation detector and the detection signal of the second rotation detector being used by the circuitry for control, and
wherein the circuitry is configured to switch the detection signal of the second rotation detector to the detection signal of the first rotation detector in a case in which the second motor applies the driving torque to the driven shaft and the first motor reduces the backlash between the second motor and the driven shaft.

2. A drive device comprising:
a first motor including a first rotation detector configured to measure a first rotation angle of the first motor and output the measured first rotation angle as a detection signal,
the first motor configured to rotate a driven shaft to apply a driving torque to the driven shaft;
a second motor including a second rotation detector provided separately from the first rotation detector, the second rotation detector being configured to measure a second rotation angle of the second motor and output the measured second rotation angle as a detection signal,
the second motor configured to apply a driving torque to the driven shaft; and
circuitry configured to control the first motor and the second motor, based on the detection signal of the second rotation detector,
wherein the circuitry is configured to switch the detection signal of the first rotation detector and the detection signal of the second rotation detector, both the detection signal of the first rotation detector and the detection signal of the second rotation detector being used by the circuitry for control, and
wherein the circuitry is configured to switch the detection signal of the second rotation detector to the detection signal of the first rotation detector in a case in which the second motor applies the driving torque to the driven shaft and the first motor reduces a backlash between the second motor and the driven shaft.

3. The drive device according to claim 2, further comprising a memory configured to store a correction value to correct the detection signal of the second rotation detector,
wherein the circuitry is configured to correct the detection signal of the second rotation detector using the correction value, and
wherein the correction value is data indicating an angular deviation between the second motor and the driven shaft in response to application of the driving torque by the second motor.

4. A drive device comprising:
a first motor including a first rotation detector configured to measure a first rotation angle of the first motor and output the measured first rotation angle as a detection signal,
the first motor configured to rotate a driven shaft based on a drive command that is a command value indicating one of a voltage value, a current value, and a torque value;
a second motor including a second rotation detector provided separately from the first rotation detector, the second rotation detector being configured to measure a second rotation angle of the second motor and output the measured second rotation angle as a detection signal,
the second motor configured to rotate the driven shaft based on the drive command; and
circuitry configured to:
select one of the detection signal of the first rotation detector and the detection signal of the second rotation detector, based on the drive command; and control the first motor and the second motor, based on the one of the detection signal of the first rotation detector and the detection signal of the second rotation detector, selected by the circuitry, the circuitry configured to:
select the detection signal of the second rotation detector in one of a case in which the command value is less than a negative limit value and a case in which the command value is equal to or greater than 0 and is less than a positive limit value; and
select the detection signal of the first rotation detector in one of a case in which the command value is equal to or greater than the negative limit value and is less than 0 and a case in which the command value is equal to or greater than the positive limit value, wherein the circuitry is configured to switch the detection signal of the first rotation detector and the detection signal of the second rotation detector, both the detection signal of the first rotation detector and the detection signal of the second rotation detector being used by the circuitry for control, and wherein the circuitry is configured to switch the detection signal of the second rotation detector to the detection signal of the first rotation detector in a case in which the second motor applies a driving torque to the driven shaft and the first motor reduces a backlash between the second motor and the driven shaft.

5. The drive device according to claim 4, further comprising a memory configured to store a correction value to correct the detection signal, wherein the circuitry is configured to acquire the correction value from the memory based on the command value and correct the detection signal selected by the circuitry, by using the correction value, and wherein the circuitry is configured to control the first motor and the second motor, based on the detection signal corrected by the circuitry.

6. The drive device according to claim 5,
wherein the correction value includes:
data indicating an angular deviation between the first motor and the driven shaft in a case in which the command value is 0, the positive limit value, and the negative limit value; and
data indicating an angular deviation between the second motor and the driven shaft in a case in which the command value is 0, the positive limit value, and the negative limit value.

7. The drive device according to claim 5,
wherein the memory is configured to store a table that indicates a relation between the command value and the correction value or an equation that indicates a relation between the command value and the correction value, and
wherein the circuitry is configured to refer to the memory and acquire the correction value, based on the command value.

8. The drive device according to claim 5,
wherein the memory is configured to store a plurality of tables that indicate relations between the command value and the correction value or a plurality of equations that indicate relations between the command value and the correction value, and
wherein the circuitry is configured to select one table of the plurality of tables or one equation of the plurality of equations.

9. The drive device according to claim 5,
wherein the circuitry is configured to update the correction value.

10. The drive device according to claim 1, wherein the circuitry is configured to control the first motor and the second motor, based on the detection signal of the second rotation detector and an angular deviation amount between the second motor and the driven shaft.

* * * * *